US012780713B2

(12) United States Patent
Takano et al.

(10) Patent No.: US 12,780,713 B2
(45) Date of Patent: Nov. 3, 2026

(54) OPTICAL FIBER PRODUCTION METHOD, OPTICAL FIBER, OPTICAL FIBER RIBBON PRODUCTION METHOD, OPTICAL FIBER RIBBON, OPTICAL FIBER PRODUCTION DEVICE, AND OPTICAL FIBER RIBBON PRODUCTION DEVICE

(71) Applicant: SUMITOMO ELECTRIC INDUSTRIES, LTD., Osaka (JP)

(72) Inventors: Junya Takano, Osaka (JP); Tetsuya Hayashi, Osaka (JP); Tetsu Morishima, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 231 days.

(21) Appl. No.: 18/564,647

(22) PCT Filed: Apr. 19, 2022

(86) PCT No.: PCT/JP2022/018193

§ 371 (c)(1),
(2) Date: Nov. 28, 2023

(87) PCT Pub. No.: WO2022/254986

PCT Pub. Date: Dec. 8, 2022

(65) Prior Publication Data

US 2024/0254032 A1 Aug. 1, 2024

(30) Foreign Application Priority Data

Jun. 4, 2021 (JP) ................................ 2021-094105

(51) Int. Cl.
*C03B 37/025* (2006.01)
*C03B 37/029* (2006.01)
(Continued)

(52) U.S. Cl.
CPC ........ *C03B 37/0253* (2013.01); *C03B 37/029* (2013.01); *C03C 25/106* (2013.01);
(Continued)

(58) Field of Classification Search
None
See application file for complete search history.

(56) References Cited

U.S. PATENT DOCUMENTS

| | | | |
|---|---|---|---|
| 4,882,497 | A | 11/1989 | Inoue et al. |
| 5,298,047 | A | 3/1994 | Hart, Jr. et al. |

(Continued)

FOREIGN PATENT DOCUMENTS

| | | | |
|---|---|---|---|
| CN | 1931757 | A | 3/2007 |
| CN | 102889862 | A | 1/2013 |

(Continued)

OTHER PUBLICATIONS

JP-S64141126-A Machine Translation by Clarivate Analytics retrieved Nov. 3, 2025. (Year: 2025).*

(Continued)

*Primary Examiner* — Lisa L Herring
(74) *Attorney, Agent, or Firm* — McDonald Hopkins LLC

(57) ABSTRACT

An optical fiber production method is a method for producing an optical fiber including a glass fiber, the method including: heating and melting an optical fiber preform by a heating furnace, and drawing the glass fiber; acquiring a lateral observation image of the glass fiber at an observation position; calculating a variable related to an azimuth angle about a central axis of the glass fiber based on the lateral observation image; and applying a rotation about the central axis to the glass fiber based on the variable.

6 Claims, 10 Drawing Sheets

(51) Int. Cl.

| | |
|---|---|
| ***C03C 25/106*** | (2018.01) |
| ***G01M 11/00*** | (2006.01) |
| ***G02B 6/44*** | (2006.01) |

(52) U.S. Cl.

CPC ............. *G01M 11/33* (2013.01); *G02B 6/448* (2013.01); *C03B 2205/06* (2013.01)

(56) References Cited

U.S. PATENT DOCUMENTS

| | | | | |
|---|---|---|---|---|
| 5,408,309 | A | | 4/1995 | Shimada et al. |
| 2002/0066292 | A1 | | 6/2002 | Wang |
| 2002/0126944 | A1 | | 9/2002 | Kim et al. |
| 2016/0229733 | A1 | | 8/2016 | Nakanishi et al. |
| 2017/0285258 | A1 | | 10/2017 | Kokura |
| 2020/0064549 | A1 | | 2/2020 | Nishina et al. |
| 2023/0221487 | A1 | | 7/2023 | Hanzawa et al. |
| 2024/0254032 | A1 | | 8/2024 | Takano et al. |

FOREIGN PATENT DOCUMENTS

| | | | | | |
|---|---|---|---|---|---|
| CN | 210089976 | U | | 2/2020 | |
| CN | 115917278 | A | | 4/2023 | |
| JP | S64-014126 | A | | 1/1989 | |
| JP | S6414126 | A | * | 1/1989 | |
| JP | H02-196204 | A | | 8/1990 | |
| JP | H06-123672 | A | | 5/1994 | |
| JP | H08-277139 | A | | 10/1996 | |
| JP | H10-020142 | A | | 1/1998 | |
| JP | 2000-213912 | A | | 8/2000 | |
| JP | 2001-004486 | A | | 1/2001 | |
| JP | 2001097732 | A | * | 4/2001 | ........... C03B 37/032 |
| JP | 2002-082018 | A | | 3/2002 | |
| JP | 2002-286583 | A | | 10/2002 | |
| JP | 2009-007201 | A | | 1/2009 | |
| JP | 2014-159348 | A | | 9/2014 | |
| JP | 2020-020998 | A | | 2/2020 | |
| JP | 2021-156761 | A | | 10/2021 | |
| WO | 2016/047669 | A1 | | 3/2016 | |
| WO | 2020/162410 | A1 | | 8/2020 | |

OTHER PUBLICATIONS

JPS6414126A Clarivate Analytics Machine Translation retrieved Jan. 20, 2026. (Year: 2026).*

JP-2001097732-A Machine Translation by Clarivate Analytics retrieved Jan. 22, 2026. (Year: 2026).*

Preliminary Amendment for U.S. Appl. No. 18/855,123, filed Oct. 8, 2024.

English specification for U.S. Appl. No. 18/855,123, filed Oct. 8, 2024.

International Search Report issued in Patent Application No. PCT/JP2022/018193 dated Jun. 14, 2022.

Takuji Nagashima et al., "Multi-core fibre with concaved double-D shape cross section," Proc. European Conference on Optical Communication (ECOC), p.M.2.B.5(2017).

Andrew D. Yablon, "Multi-Wavelength Optical Fiber Refractive Index Profiling by Spatially Resolved Fourier Transform Spectroscopy," Journal of Lightwave Technology, vol. 28, No. 4, pp. 360-364, Feb. 15, 2010.

US Notice of Allowance issued in U.S. Appl. No. 18/855,123 dated Jun. 2, 2026.

* cited by examiner

OPTICAL FIBER PRODUCTION METHOD, OPTICAL FIBER, OPTICAL FIBER RIBBON PRODUCTION METHOD, OPTICAL FIBER RIBBON, OPTICAL FIBER PRODUCTION DEVICE, AND OPTICAL FIBER RIBBON PRODUCTION DEVICE

TECHNICAL FIELD

The present disclosure relates to an optical fiber production method, an optical fiber, an optical fiber ribbon production method, an optical fiber ribbon, an optical fiber production device, and an optical fiber ribbon production device. The present application claims priority to Japanese Patent Application No. 2021-094105 filed on Jun. 4, 2021, the content of which is incorporated herein by reference in its entirety.

BACKGROUND ART

In a usual optical fiber drawing process, the entire optical fiber becomes twisted, so that an azimuth angle about the central axis of the optical fiber differs depending on the position in the longitudinal direction. Thus, when a usual drawing process is applied to the drawing of a multicore optical fiber (MCF), misalignment in the rotation angle of the plurality of cores occurs relative to the longitudinal direction. Consequently, aligning takes time when joining the optical fibers.

Patent Literature 1 discloses an optical fiber production method in which torque is applied to an optical fiber during the drawing process by angling a guide roller, and the optical fiber is twisted clockwise and anticlockwise alternately when viewed in the longitudinal direction to suppress polarization mode dispersion (PMD).

Patent Literature 2 discloses, in a method of producing an optical fiber having at least one hole, a technique of controlling the diameter of the hole by irradiating an optical fiber with illumination light during drawing, detecting the shadow of the hole from the transmitted light, and feedback controlling the pressurizing force of a pressurizing device on the hole of the optical fiber according to the width of the shadow of the hole, to thereby control the diameter of the hole to be uniform along the entire length in the longitudinal direction.

Non patent Literature 1 discloses an MCF having a non-circular cladding structure, such as a rectangular shape, a barrel shape, or a D-shape, which facilitates rotational alignment during connection.

CITATION LIST

Patent Literature

Patent Literature 1: U.S. Pat. No. 5,298,047

Patent Literature 2: Japanese Unexamined Patent Publication No. 2009-7201

Non Patent Literature

Non Patent Literature 1: T. Nagashima et al., "Multi-core fibre with concaved double-D shape cross section," Proc. European Conference on Optical Communication (ECOC), p.M.2.B.5 (2017).

SUMMARY OF INVENTION

An optical fiber production method of the present disclosure is a method for producing an optical fiber including a glass fiber, the method including: heating and melting an optical fiber preform by a heating furnace, and drawing the glass fiber; acquiring a lateral observation image of the glass fiber at an observation position; calculating a variable related to an azimuth angle about a central axis of the glass fiber based on the lateral observation image; and applying a rotation about the central axis to the glass fiber based on the variable.

An optical fiber of the present disclosure is an optical fiber including a glass fiber, wherein the optical fiber is wound onto a bobbin such that an amount of variation in an azimuth angle about a central axis of the glass fiber is 180° or less along an entire length.

An optical fiber ribbon production method of the present disclosure is a method for producing an optical fiber ribbon including a plurality of optical fibers arranged in parallel, and a coating covering the plurality of optical fibers together, the method including: drawing the plurality of optical fibers from a feeding device; collecting the plurality of optical fibers by a line collection roller, and arranging the plurality of optical fibers in parallel; acquiring a lateral observation image of the plurality of optical fibers at an observation position; calculating a variable related to an azimuth angle about a central axis of each of the plurality of optical fibers based on the lateral observation image; and applying a rotation to each of the plurality of optical fibers based on the variable.

An optical fiber ribbon of the present disclosure includes: a plurality of optical fibers arranged in parallel; and a resin covering the plurality of optical fibers together, wherein an amount of variation in an azimuth angle about a central axis of each of the plurality of optical fibers is 180° or less along an entire length.

An optical fiber production device of the present disclosure is a device for producing an optical fiber including a glass fiber, the device including: a heating furnace configured to heat and melt an optical fiber preform; an imaging device configured to acquire a lateral observation image of the glass fiber drawn from the optical fiber preform that has been melted; a calculator configured to calculate a variable related to an azimuth angle about a central axis of the glass fiber based on the lateral observation image; and a rotation control unit configured to apply a rotation to the glass fiber based on the variable.

An optical fiber ribbon production device of the present disclosure is a device for producing an optical fiber ribbon including a plurality of optical fibers arranged in parallel, and a coating covering the plurality of optical fibers together, the device including: a feeding device configured to feed the plurality of optical fibers; an imaging device configured to acquire a lateral observation image of the plurality of optical fibers; a calculator configured to calculate a variable related to an azimuth angle about a central axis of each of the plurality of optical fibers based on the lateral observation image; and a plurality of rotation control units configured to apply a rotation to each of the plurality of optical fibers based on the variable.

DESCRIPTION OF EMBODIMENTS

Figure 1:
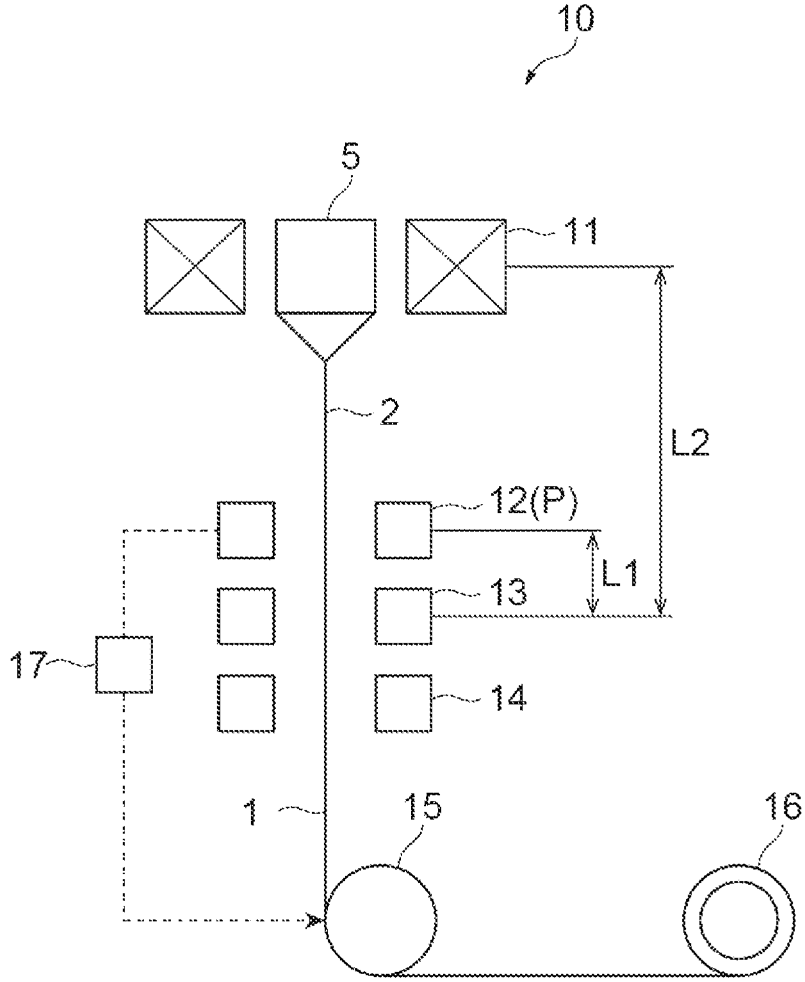
FIG. 1 is a schematic view of an optical fiber production device according to a first embodiment.

Problems to be Solved by the Present Disclosure

It is an object of the present disclosure to provide an optical fiber production method, an optical fiber, an optical fiber ribbon production method, an optical fiber ribbon, an optical fiber production device, and an optical fiber ribbon production device that are capable of suppressing variation in an azimuth angle about a central axis.

Advantageous Effects of the Present Disclosure

The present disclosure is capable of providing an optical fiber production method, an optical fiber, an optical fiber ribbon production method, an optical fiber ribbon, an optical fiber production device, and an optical fiber ribbon production device that are capable of suppressing variation in an azimuth angle about a central axis.

DESCRIPTION OF EMBODIMENTS OF THE PRESENT DISCLOSURE

Embodiments of the present disclosure will first be listed and described. An optical fiber production method according to an embodiment of the present disclosure is a method for producing an optical fiber including a glass fiber, and includes: heating and melting an optical fiber preform by a heating furnace, and drawing the glass fiber; acquiring a lateral observation image of the glass fiber at an observation position; calculating a variable related to an azimuth angle about a central axis of the glass fiber based on the lateral observation image; and applying a rotation about the central axis to the glass fiber based on the variable. Here, "an azimuth angle about a central axis of the glass fiber" refers to an angle between a straight line connecting a center of the glass fiber and a specific point, and a predetermined straight line passing through the center, in a cross-section of the glass fiber. In the optical fiber production method above, variation in the azimuth angle about the central axis can be suppressed.

The optical fiber production method above may further include applying a coating resin to a surface of the glass fiber by a die, wherein the observation position may be between the die and the optical fiber preform, and a distance L1 between the observation position and the die and a distance L2 between the die and a center of the heating furnace may satisfy $L1/L2 \leq 0.2$. In this case, a side surface of the glass fiber is observed in a positional range in which the amount of axial misalignment of the glass fiber is at a minimum, so that reduction in the observation accuracy can be suppressed.

The variable may be a correlation coefficient between a luminance profile of the lateral observation image acquired at a first time, and a luminance profile of the lateral observation image acquired at a second time after a predetermined time has passed from the first time. In this case, the azimuth angle about the central axis of the glass fiber can be accurately adjusted.

The variable may be a luminance value of a characteristic peak of a luminance profile of the lateral observation image acquired at a first time, and a luminance value of a characteristic peak of a luminance profile of the lateral observation image acquired at a second time after a predetermined time has passed from the first time. In this case, the azimuth angle about the central axis of the glass fiber can be accurately adjusted.

The variable may be the azimuth angle calculated from a luminance profile of the lateral observation image using a regression analysis result based on a multivariate analysis performed on a luminance profile of learning data acquired in advance. In this case, the azimuth angle about the central axis of the glass fiber can be accurately adjusted.

Applying the rotation may include applying a rotation to the glass fiber by a swing guide roller. In this case, the rotation can be easily applied to the optical fiber by a simple configuration.

The optical fiber production method above may further include winding the optical fiber onto a bobbin such that an amount of variation in the azimuth angle is 180° or less along an entire length. Here, the "azimuth angle of the optical fiber" when wound onto a bobbin refers to an angle between a straight line connecting a center of the optical fiber and a specific point, and a straight line passing through the center and parallel to an axis of the bobbin, in a cross-section of the optical fiber. In this case, the optical fiber wound onto the bobbin with the variation in the azimuth angle about the central axis being suppressed can be produced.

An optical fiber according to an embodiment of the present disclosure is an optical fiber including a glass fiber, wherein the optical fiber is wound onto a bobbin such that an amount of variation in an azimuth angle about a central axis of the glass fiber is 180° or less along an entire length. In the optical fiber above, the variation in the azimuth angle about the central axis is suppressed.

The optical fiber above may be an MCF. In this case, rotational misalignment of a plurality of cores is suppressed.

The optical fiber above may be a polarization-maintaining optical fiber. In this case, rotational misalignment of a principal axis of refractive index is suppressed.

An optical fiber ribbon production method according to an embodiment of the present disclosure is a method for producing an optical fiber ribbon including a plurality of optical fibers arranged in parallel, and a coating covering the plurality of optical fibers together, the method including: drawing the plurality of optical fibers from a feeding device; collecting the plurality of optical fibers by a line collection roller, and arranging the plurality of optical fibers in parallel; acquiring a lateral observation image of the plurality of optical fibers at an observation position; calculating a variable related to an azimuth angle about a central axis of each of the plurality of optical fibers based on the lateral observation image; and applying a rotation to each of the plurality of optical fibers based on the variable. In the optical fiber ribbon production method above, variation in the azimuth angle about the central axis can be suppressed. As a result, the optical fiber ribbon including the plurality of the optical fibers having the same azimuth angle about the central axis can be produced.

The optical fiber ribbon production method above may further include applying a coating resin to surfaces of the plurality of optical fibers together by a die, wherein the observation position may be closer to the feeding device than the die, and a distance L1 between the observation position and the die and a distance L2 between the die and a center of the line collection roller may satisfy $L1/L2 \leq 0.2$. In this case, the side surface of the optical fiber is observed in a positional range in which the amount of axial misalignment of the optical fiber is at a minimum, so that reduction in the observation accuracy can be suppressed.

The feeding device may include a plurality of bobbins onto which the plurality of optical fibers are wound such that an amount of variation in an azimuth angle about a central axis of each of the plurality of optical fibers is 180° or less along an entire length. In this case, since optical fibers in which the variation in the azimuth angle about the central axis is suppressed are fed from the feeding device, the optical fiber ribbon including the plurality of optical fibers which have the same azimuth angle about the central axis can be easily produced by making minor adjustments.

An optical fiber ribbon according to an embodiment of the present disclosure includes: a plurality of optical fibers arranged in parallel; and a resin covering the plurality of optical fibers together, wherein an amount of variation in an azimuth angle about a central axis of each of the plurality of optical fibers is 180° or less along an entire length. In the optical fiber ribbon above, variation in the azimuth angle about the central axis of the plurality of optical fibers is suppressed.

The plurality of optical fibers may be MCFs, and may be arranged in parallel such that central values of azimuth of arrangement of cores of the plurality of optical fibers match each other. In this case, rotational misalignment of the cores is suppressed.

The plurality of optical fibers may be polarization-maintaining optical fibers, and may be arranged in parallel such that central values of azimuth of a principal axis of refractive index of the plurality of optical fibers match each other. In this case, rotational misalignment of the principal axis of refractive index is suppressed.

An optical fiber production device according to an embodiment of the present disclosure is a device for producing an optical fiber including a glass fiber, the device including: a heating furnace configured to heat and melt an optical fiber preform; an imaging device configured to acquire a lateral observation image of the glass fiber drawn from the optical fiber preform that has been melted; a calculator configured to calculate a variable related to an azimuth angle about a central axis of the glass fiber based on the lateral observation image; and a rotation control unit configured to apply a rotation to the glass fiber based on the variable. In the optical fiber production device above, variation in the azimuth angle about the central axis can be suppressed.

An optical fiber ribbon production device according to an embodiment of the present disclosure is a device for producing an optical fiber ribbon including a plurality of optical fibers arranged in parallel, and a coating covering the plurality of optical fibers together, the device including: a feeding device configured to feed the plurality of optical fibers; an imaging device configured to acquire a lateral observation image of the plurality of optical fibers; a calculator configured to calculate a variable related to an azimuth angle about a central axis of each of the plurality of optical fibers based on the lateral observation image; and a plurality of rotation control units configured to apply a rotation to each of the plurality of optical fibers based on the variable. In the optical fiber ribbon production device above, the optical fiber ribbon including the plurality of the optical fibers having the same azimuth angle about the central axis can be produced.

In the optical fiber production device and the optical fiber ribbon production device of the present disclosure, the imaging device may include: a light source configured to irradiate side surfaces of the plurality of optical fibers with light; and a detector configured to detect transmitted light transmitted through the plurality of optical fibers. In this case, the lateral observation image of the optical fiber can be acquired.

DETAILS OF EMBODIMENTS OF THE PRESENT DISCLOSURE

Specific examples of an optical fiber production method, an optical fiber, an optical fiber ribbon production method, an optical fiber ribbon, an optical fiber production device, and an optical fiber ribbon production device of the present disclosure will be described below with reference to the drawings. It should be noted that the present invention is not limited to these examples, but is defined by the scope of the claims, and is intended to include all modifications within the meaning and scope equivalent to the scope of the claims. Same reference signs are given to the same elements in the description of the drawings, and redundant description will be omitted.

First Embodiment

FIG. 1 is a schematic view of an optical fiber production device 10 according to a first embodiment. An optical fiber 1 according to the first embodiment includes, for example, a glass fiber 2 having a circular cross-section, and a refractive index changing part provided inside the glass fiber 2, and has a structure having positional degrees of freedom of the refractive index changing part in azimuth about a central axis C (see FIG. 6). Examples of such optical fiber 1 include an MCF and a polarization-maintaining optical fiber. The glass fiber 2 need not be axially symmetrical, and may have a non-circular cross-sectional shape. An MCF is taken as an example in the description below. In the first embodiment, the optical fiber 1 includes a coating (not shown) that covers an outer surface of the glass fiber 2.

The glass fiber 2 has a plurality of cores 3 (see FIG. 2) and a cladding 4 (see FIG. 2) that surrounds the plurality of cores 3. In the first embodiment, the cores 3 and the cladding 4 have different refractive indexes, so that light refraction occurs between the cores 3 and the cladding 4. The glass fiber 2 has four cores 3. A lateral observation image of the glass fiber 2 changes according to an azimuth angle (rotation angle) q (see FIG. 6) about the central axis C of the glass fiber 2 due to light refraction, etc., in the refractive index changing part of the glass fiber 2. It should be noted that the unit of the azimuth angle φ and the rotation angle is °.

The production device 10 of the optical fiber 1 produces the optical fiber 1 including the glass fiber 2 from an optical fiber preform 5. The production device 10 includes a heating furnace 11, an imaging device 12, a die 13, an ultraviolet irradiation unit 14, a guide roller unit 15, a bobbin 16, and a calculator 17. The heating furnace 11 heats and melts the optical fiber preform 5. The glass fiber 2 is drawn downward in a vertical direction from a lower end of the optical fiber preform 5 melted by the heating furnace 11.

The imaging device 12 acquires a lateral observation image of the glass fiber 2 at an observation position P closer to the optical fiber preform 5 than the die 13. A distance L1 between the observation position P and the die 13, and a distance L2 between the die 13 and a center of the heating furnace 11 satisfy L1/L2≤0.2. These distances are both distances along a length direction of the glass fiber 2. The center of the heating furnace 11 is a center position of the heating furnace 11 in the vertical direction. The observation position P may be downstream of the die 13, that is, on a side of the die 13 opposite that of the optical fiber preform 5. In this case, L1/L2≤0.2 is also satisfied. The imaging device 12 is communicably connected to the calculator 17, and transmits the lateral observation image to the calculator 17.

Figure 2:
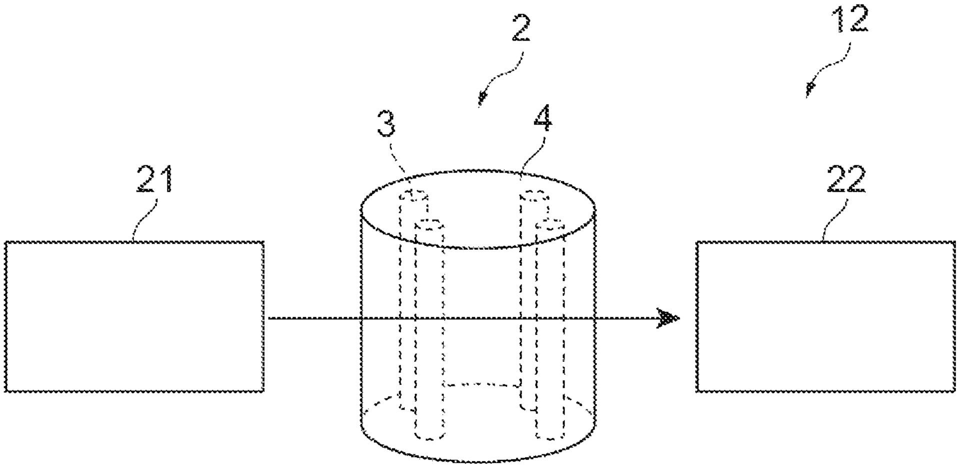
FIG. 2 is a schematic view illustrating a configuration of an imaging device.

FIG. 2 is a schematic view illustrating a configuration of the imaging device 12. The imaging device 12 has a light source 21 and a detector 22 facing each other with the glass fiber 2 interposed therebetween. The light source 21 irradiates a side surface of the glass fiber 2 with light. The detector 22 detects transmitted light transmitted through the glass fiber 2. The detector 22 includes, for example, an optical sensor (CCD array, camera, etc.). The imaging device 12 acquires the lateral observation image of the glass fiber 2 by detecting light emitted from the light source 21 of an irradiation device by the detector 22.

The imaging device 12 may acquire the lateral observation image of an optical fiber by having a total of two polarizers disposed in an orthogonal relationship to each other (crossed Nicols), with one polarizer between the glass fiber 2 and the light source 21, and one polarizer between the glass fiber 2 and the detector 22. In this case, birefringence occurs due to the deformation of the glass fiber due to residual stress, causing the polarization state of the light transmitted through the glass fiber to be changed. Thus, the transmitted light that is transmitted through the glass fiber passes between the orthogonal polarizers and can be detected with high accuracy by the detector, while light that is not transmitted through the glass fiber cannot be detected much. Consequently, a lateral observation image having a high contrast can be acquired by using crossed Nicols.

The die 13 is a metal jig having a hole in a center portion for passing the glass fiber 2 therethrough. The die 13 is installed to apply a coating resin to the outer surface of the glass fiber 2 that is drawn. In the first embodiment, the coating resin is an ultraviolet curable resin. The vicinity of the die 13 is where variation in the position of the glass fiber 2 is small, and an out-of-focus degree can be most suppressed when lateral observation is made by the imaging device 12. The observation position P of the imaging device 12 is thus provided in the upstream vicinity of the die 13.

The ultraviolet irradiation unit 14 is disposed downstream of the die 13, and irradiates the ultraviolet curable resin applied to the glass fiber 2 by the die 13 with ultraviolet light. The ultraviolet curable resin is cured by the irradiation of the ultraviolet light, and forms a coating covering the outer surface of the glass fiber 2. The optical fiber 1 including the glass fiber 2 and the coating is thus formed.

The guide roller unit 15 is disposed between the ultraviolet irradiation unit 14 and the bobbin 16, and guides the optical fiber 1 to the bobbin 16. Although FIG. 1 is simplified to illustrate only one guide roller, the guide roller unit 15 actually has two or three or more guide rollers.

Figure 3:
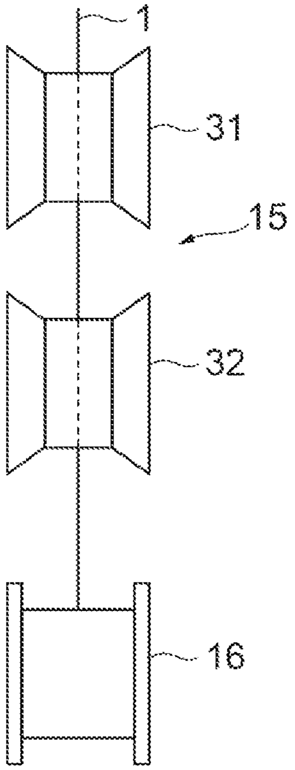
FIG. 3 is a schematic view illustrating a configuration of a guide roller unit.
Figure 4:
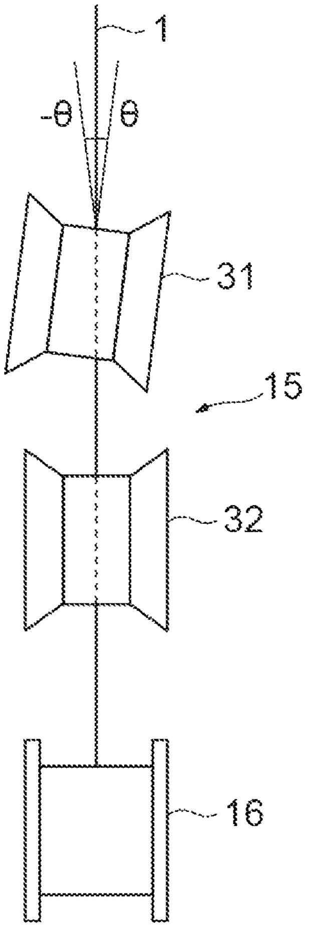
FIG. 4 is a schematic view illustrating a configuration of the guide roller unit.

FIGS. 3 and 4 are schematic views illustrating a configuration of the guide roller unit 15. The guide roller unit 15 of the first embodiment has a first guide roller 31 provided on an upstream side (ultraviolet irradiation unit 14 side), and a second guide roller 32 provided on a downstream side (bobbin 16 side).

The guide roller unit 15 includes a swing guide roller. In the first embodiment, the first guide roller 31 is the swing guide roller, but the second guide roller 32 may be the swing guide roller. The first guide roller 31 is a rotation control unit that applies a rotation (twist) about the central axis C to the optical fiber 1 (glass fiber 2) by tilting a rotational axis direction of the first guide roller 31 relative to the central axis C of the optical fiber 1. The rotation control unit controls the azimuth angle q about the central axis C of the optical fiber 1 by performing a physical operation on the optical fiber 1 during drawing. The swing guide roller is an example of the rotation control unit. In the production device 10, the rotation may be applied to the optical fiber 1 by a configuration other than the swing guide roller.

As illustrated in FIG. 4, the first guide roller 31 oscillates (swings) alternately relative to the central axis C of the optical fiber 1. The first guide roller 31 oscillates alternately in a range in which an angle between the central axis C of the optical fiber 1 and a plane perpendicular to the rotational axis direction of the first guide roller 31 is +θ. A direction of twist applied to the optical fiber 1 when the first guide roller 31 tilts to a plus angle is opposite to that when the first guide roller 31 tilts to a minus angle. Thus, clockwise and anticlockwise torque are generated alternately on the optical fiber 1 during drawing, thereby applying a rotation (twist) to the optical fiber 1.

The first guide roller 31 is communicably connected to the calculator 17, and receives a control signal from the calculator 17. The first guide roller 31 tilts based on the control signal received from the calculator 17, and applies a rotation to the optical fiber 1. The method for applying twist to a fiber by a guide roller is also disclosed in Patent Literature 1. However, a feedback function is not contemplated in Patent Literature 1.

The optical fiber 1 is wound onto the bobbin 16. The optical fiber 1 (glass fiber 2) is wound onto the bobbin 16 such that the amount of variation in the azimuth angle φ about the central axis Cis 180° or less, preferably 120° or less, more preferably 90° or less, and further preferably 60° or less along the entire length. Here, the entire length is at least 100 m or more, preferably 1 km or more, more preferably 5 km or more, and particularly preferably 10 km or more.

The calculator 17 is communicably connected to the imaging device 12 and the first guide roller 31. The calculator 17 receives the lateral observation image from the imaging device 12. The calculator 17 calculates a variable related to the azimuth angle φ about the central axis C of the glass fiber 2 based on the acquired lateral observation image. The calculator 17 feedback controls the first guide roller 31 during drawing based on the calculation result. The calculator 17 transmits a control signal according to the calculation result to the first guide roller 31.

The calculator 17 extracts a luminance profile from the lateral observation image, and calculates, for example, a correlation coefficient and multivariate analysis. The variable calculated by the calculator 17 is, for example, a correlation coefficient $s_{12}/(s_1 \times s_2)$ between a luminance profile $L_{1i}$ (i is a reference sign representing pixels of a sensor) of a lateral observation image acquired at a first time and a luminance profile $L_{2i}$ of a lateral observation image acquired at a second time after a predetermined time has passed from the first time ($s_1$ is a standard deviation of $L_{1i}$, $s_2$ is a standard deviation of $L_{2i}$, and $s_{12}$ is a covariance of $L_{1i}$ and $L_{2i}$). The higher the value of the correlation coefficient, the less the temporal change in the azimuth angle φ. The variable may, for example, be a luminance value of a characteristic peak of a luminance profile of the lateral observation image acquired at the first time, and a luminance value of a characteristic peak of a luminance profile of the lateral observation image acquired at the second time after a predetermined time has passed from the first time. The characteristic peak is a maximum value or a minimum value of the luminance profile, and is, for example, a peak at which the luminance profile is at a maximum.

In a case in which the structure of the optical fiber 1 to be drawn is known, learning data of a luminance profile of a desired rotation angle of the optical fiber 1 may be prepared and used. The calculator 17 may calculate a regression analysis based on a multivariate analysis of the luminance profile of the learning data acquired in advance and the luminance profile of a lateral observation image acquired at a certain time. In this case, the variable is the azimuth angle φ calculated from the luminance profile of the lateral observation image using the regression analysis result based on the multivariate analysis performed on the luminance profile of the learning data acquired in advance.

The calculator 17 may be configured as a computer system including, for example, a processor such as a central processing unit (CPU), memories such as a random access memory (RAM) and a read only memory (ROM), input output devices such as a touch panel, a mouse, a keyboard, and a display, and a communication device such as a network card. The calculator 17 achieves the functions of the calculator 17 by operating each hardware under the control of the processor based on computer programs stored in the memory.

A production method of the optical fiber 1 according to the first embodiment includes a drawing step, an application step, an ultraviolet light irradiation step, and a winding step. According to this production method, the optical fiber 1 including the glass fiber 2 is produced. The drawing step is a step of heating and melting the optical fiber preform 5 by the heating furnace 11, and drawing the glass fiber 2. The application step is a step of applying a coating resin to a surface of the glass fiber 2 by the die 13. The ultraviolet light irradiation step is a step of irradiating the coating resin on the surface of the glass fiber 2 with ultraviolet light by the ultraviolet irradiation unit 14. The winding step is a step of winding the optical fiber 1 onto the bobbin 16.

Figure 5:
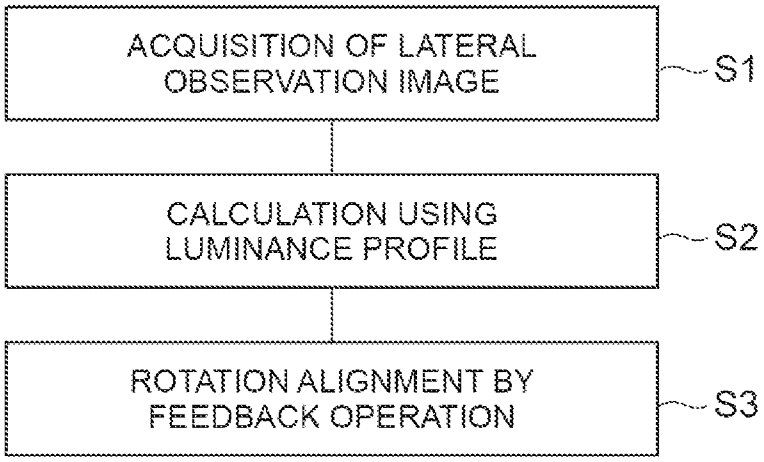
FIG. 5 is a flow chart illustrating feedback control.

FIG. 5 is a flow chart illustrating feedback control. In addition to the steps above, the production method of the optical fiber 1 further includes an acquisition step S1, a calculation step S2, and a rotation step S3 to feedback control (feedback operate) the azimuth angle φ about the central axis C of the optical fiber 1 during drawing of the optical fiber 1.

The acquisition step S1 is a step of acquiring a lateral observation image of the glass fiber 2 by the imaging device 12. The acquisition step S1 is a light amount measurement step of irradiating the glass fiber 2 with light from the light source 21 and detecting the transmitted light by the detector 22 to acquire the lateral observation image. The calculation step S2 is a step of calculating a variable related to the azimuth angle φ about the central axis C of the glass fiber 2 by the calculator 17 based on the lateral observation image. The calculation step S2 is an arithmetic operation step of extracting a luminance profile from the lateral observation image and performing a calculation using the luminance profile by the calculator 17.

The rotation step S3 is a step of applying a rotation about the central axis C to the glass fiber 2 by the first guide roller 31. The first guide roller 31 feedback controls the azimuth angle φ about the central axis C of the glass fiber 2 based on a control signal according to the calculation result from the calculator 17. The rotation step S3 thus applies a rotation to the glass fiber 2 based on the variable related to the azimuth angle φ about the central axis C of the glass fiber 2. For example, in a case in which the variable is the correlation coefficient described above, a rotation is applied to the glass fiber 2 so that the value of the correlation coefficient is high. The rotation step S3 is a processing step of performing feedback on the production device 10 during drawing based on the result of the arithmetic operation step, and performing rotation alignment of the optical fiber 1.

Figure 6:
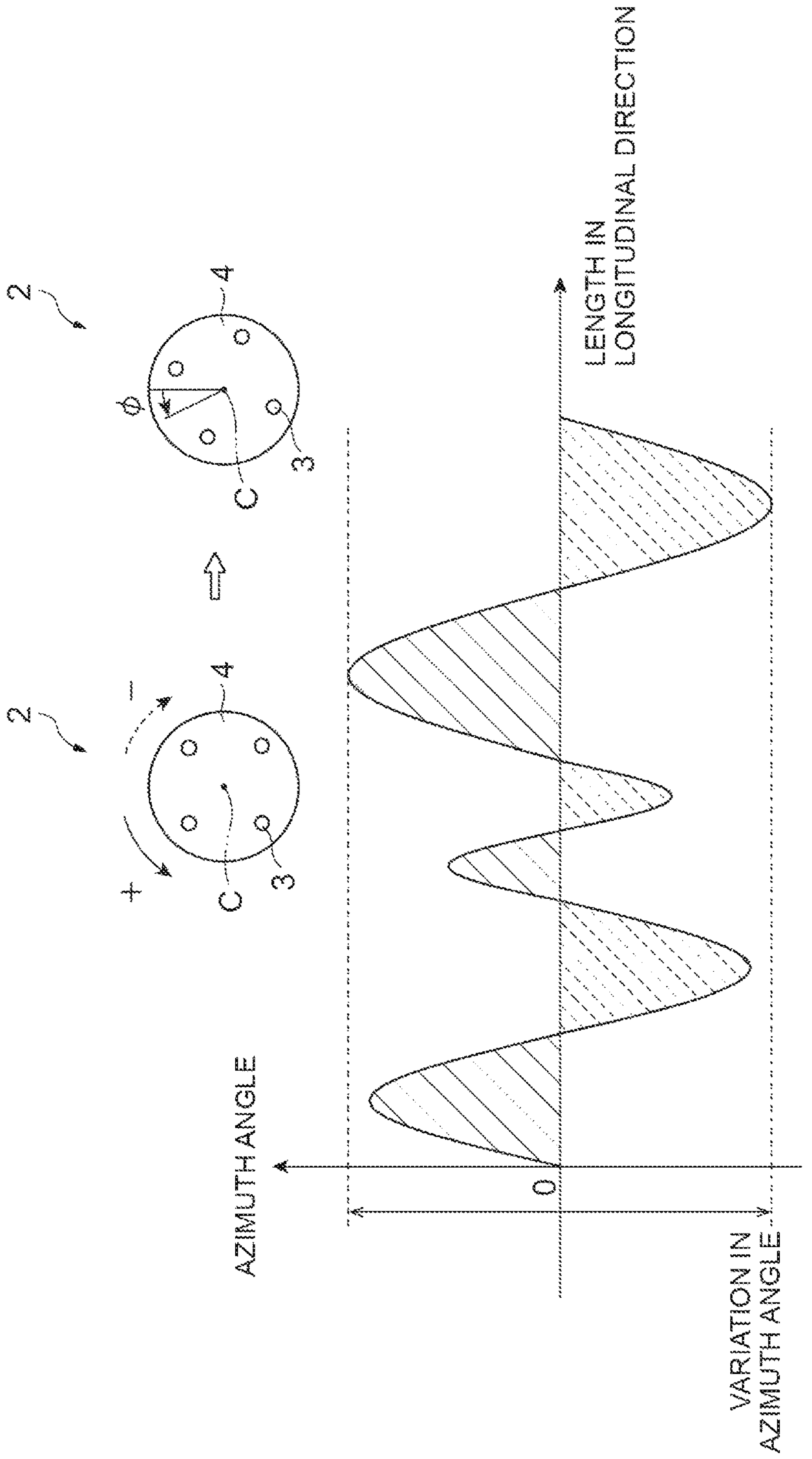
FIG. 6 is a graph showing the relationship between an azimuth angle of a glass fiber and a position in a longitudinal direction.

FIG. 6 is a graph showing the relationship between the azimuth angle φ about the central axis C of a glass fiber and the position in a longitudinal direction. The vertical axis represents the azimuth angle φ of the glass fiber 2. Here, a clockwise azimuth angle φ is indicated as minus, and an anticlockwise azimuth angle φ is indicated as plus. The horizontal axis represents the position of the optical fiber 1 wound onto the bobbin 16 in the longitudinal direction. The optical fiber 1 is wound onto the bobbin 16 such that the variation in the clockwise/anticlockwise azimuth angle φ approaches zero along the entire length of the fiber by feedback control. The amount of variation in the azimuth angle φ about the central axis C of the optical fiber 1 is thus suppressed. In the winding step above, the optical fiber 1 is wound onto the bobbin 16 such that the amount of variation in the azimuth angle φ about the central axis C is 180° or less, preferably 120° or less, more preferably 90° or less, and further preferably 60° or less along the entire length by the feedback control.

As described above, the production method of the optical fiber 1 obtains a variable related to the azimuth angle φ about the central axis C of the glass fiber 2 while drawing, and applies a rotation to the glass fiber 2 based on this variable. The variation in the azimuth angle φ about the central axis C can thus be suppressed.

In the acquisition step S1, the lateral observation image is acquired at the observation position P closer to the optical fiber preform 5 than the die 13. The distance L1 between the observation position P and the die 13, and the distance L2 between the die 13 and the center of the heating furnace 11 satisfy $L1/L2 \leq 0.2$. The side surface of the glass fiber 2 is observed in a positional range in which the amount of axial misalignment of the glass fiber 2 is at a minimum, so that reduction in the observation accuracy is suppressed.

The variable calculated in the calculation step S2 may be a correlation coefficient between a luminance profile of a lateral observation image acquired at a first time, and a luminance profile of a lateral observation image acquired at a second time after a predetermined time has passed from the first time. The variable may also be a luminance value of a characteristic peak of the luminance profile of the lateral observation image acquired at the first time, and a luminance value of a characteristic peak of the luminance profile of the lateral observation image acquired at the second time after a predetermined time has passed from the first time. Additionally, the calculation step S2 may include calculating a regression analysis based on a multivariate analysis of a luminance profile of learning data acquired in advance, and a luminance profile of a lateral observation image acquired at a certain time. In each case, the azimuth angle φ about the central axis C of the glass fiber 2 can be accurately adjusted.

Figure 7:
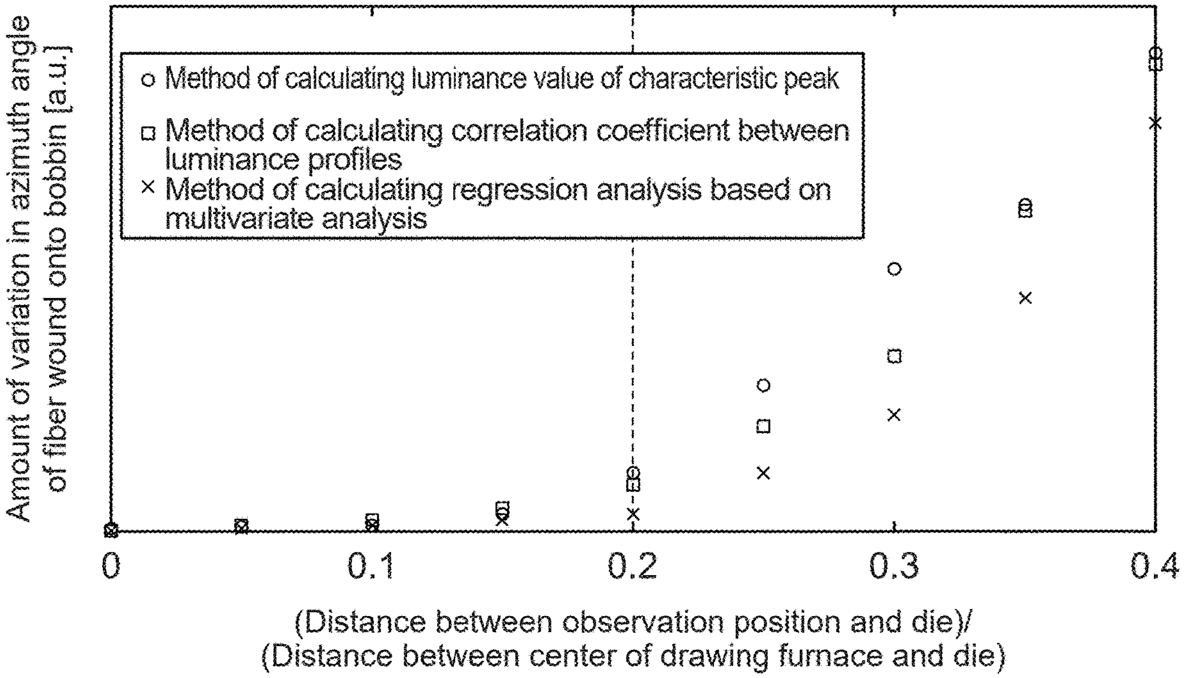
FIG. 7 is a graph showing the relationship between the amount of variation in an azimuth angle of an optical fiber wound onto a bobbin and L1/ L2.

FIG. 7 is a graph showing the relationship between the amount of variation in the azimuth angle φ of an optical fiber wound onto a bobbin and L1/L2. The vertical axis represents the amount of variation in the azimuth angle φ of the optical fiber wound onto the bobbin. The horizontal axis represents L1/L2. FIG. 7 illustrates the results of studying the relationship between the amount of variation in the azimuth angle φ of the optical fiber wound onto the bobbin and L1/L2 for each of the method of calculating the luminance value of a characteristic peak, the method of calculating the correlation coefficient between luminance profiles, and the method of calculating a regression analysis based on a multivariate analysis in the calculation step S2. In each method, it can be seen that the amount of variation is suppressed when $L1/L2 \leq 0.2$. The amount of variation is most suppressed in the method of calculating a regression analysis based on a multivariate analysis. The amount of variation is next most suppressed in the method of calculating the correlation coefficient between luminance profiles.

In the rotation step S3, a rotation is applied to the glass fiber 2 by the first guide roller 31 which is a swing guide roller. The rotation can thus be easily applied to the optical fiber 1 by a simple configuration.

In the winding step, the optical fiber 1 is wound onto the bobbin such that the amount of variation in the azimuth angle φ is 180° or less, preferably 120° or less, more preferably 90° or less, and further preferably 60° or less along the entire length. Thus, the optical fiber 1 wound onto the bobbin 16 with the variation in the azimuth angle φ about the central axis C suppressed can be produced.

The optical fiber 1 includes the glass fiber 2, and is wound onto the bobbin 16 such that the amount of variation in the azimuth angle φ about the central axis C of the glass fiber 2 is 180° or less, preferably 120° or less, more preferably 90° or less, and further preferably 60° or less along the entire length. In the optical fiber 1, the variation in the azimuth angle φ about the central axis C is suppressed. In a case in which the optical fiber 1 is an MCF, rotational misalignment of the plurality of the cores 3 is suppressed. In a case in which the optical fiber 1 is a polarization-maintaining optical fiber, rotational misalignment of a principal axis of refractive index is suppressed.

In the production device 10, the variable related to the azimuth angle φ about the central axis C of the glass fiber 2 is obtained while drawing, and a rotation is applied to the glass fiber 2 based on this variable. The variation in the azimuth angle φ about the central axis C of the optical fiber 1 can thus be suppressed.

The imaging device 12 includes the light source 21 that irradiates the side surface of the glass fiber 2 with light, and the detector 22 that detects the transmitted light transmitted through the glass fiber 2. The lateral observation image of the glass fiber 2 can thus be acquired.

Second Embodiment

Figure 8:
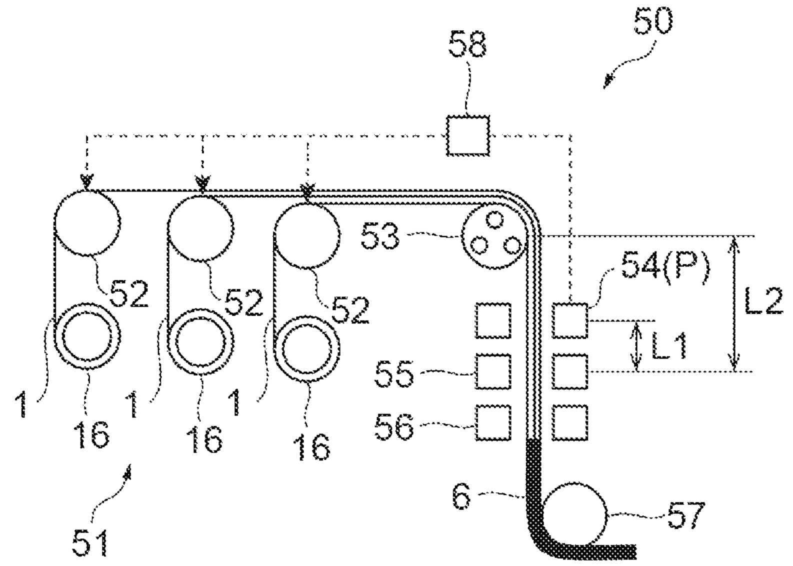
FIG. 8 is a schematic view of an optical fiber ribbon production device according to a second embodiment.

FIG. 8 is a schematic view of a production device 50 of an optical fiber ribbon according to a second embodiment. An optical fiber ribbon 6 according to the second embodiment includes a plurality of optical fibers 1 that are arranged in parallel. The optical fiber 1 is, for example, the optical fiber 1 according to the first embodiment. In the second embodiment, the optical fiber ribbon 6 includes a coating (not shown) that covers the plurality of optical fibers 1 together. That is, the optical fiber ribbon 6 includes a coating that covers each optical fiber 1 individually, and a coating that covers the plurality of optical fibers 1 together.

The production device 50 according to the second embodiment produces the optical fiber ribbon 6 from the plurality of optical fibers 1. The production device 50 includes a feeding device 51, a guide roller unit 52, a line collection roller 53, an imaging device 54, a die 55, an ultraviolet irradiation unit 56, a guide roller 57, and a calculator 58. The feeding device 51 includes a plurality of bobbins 16 onto which the optical fibers 1 are wound such that the amount of variation in an azimuth angle φ about a central axis C of each of the optical fibers 1 is 180° or less, preferably 120° or less, more preferably 90° or less, and further preferably 60° or less along the entire length, and feeds the plurality of optical fibers 1. Although FIG. 8 is simplified to illustrate only three bobbins 16, a greater number of the bobbins 16 are actually provided.

The guide roller unit 52 is disposed between the feeding device 51 and the line collection roller 53, and guides the plurality of optical fibers 1 to the line collection roller 53. The guide roller unit 52 has the same configuration as the guide roller unit 15 illustrated in FIG. 3. That is, although FIG. 8 is simplified to illustrate only one guide roller for each guide roller unit 52, each guide roller unit 52 actually has two or three or more guide rollers. In the second embodiment, each guide roller unit 52 has a first guide roller 31 provided on an upstream side (feeding device 51 side), and a second guide roller 32 provided on a downstream side (line collection roller 53 side).

The first guide roller 31 is a swing guide roller, and is a rotation control unit that applies a rotation (twist) about the central axis C to each of the plurality of optical fibers 1, as described above. The first guide roller 31 is communicably connected to the calculator 58, and receives a control signal from the calculator 58. The first guide roller 31 tilts based on the control signal received from the calculator 58, and applies a rotation to the optical fiber 1.

The line collection roller 53 collects the plurality of optical fibers 1, and arranges the plurality of optical fibers 1 in parallel. The imaging device 54 is provided between the line collection roller 53 and the die 55. The imaging device 54 has the same configuration as that of the imaging device 12 illustrated in FIG. 2. That is, the imaging device 54 has a light source 21 and a detector 22. The imaging device 54 acquires a lateral observation image of the optical fiber 1 by detecting light emitted from the light source 21 of an irradiation device by the detector 22.

The imaging device 54 acquires the lateral observation image of the plurality of optical fibers 1 at an observation position P closer to the feeding device 51 than the die 55. A distance L1 between the observation position P and the die 55, and a distance L2 between the die 55 and a center of the line collection roller 53 satisfy $L1/L2 \leq 0.2$. These distances are both distances along a length direction of the optical fiber 1. The observation position P may be downstream of the die 55, that is, on a side of the die 55 opposite that of the feeding device 51. $L1/L2 \leq 0.2$ is also satisfied in this case.

The die 55 is a metal jig having a hole in a center portion for passing the plurality of optical fibers 1 therethrough. The die 55 is installed to apply a coating resin to an outer surface of the optical fiber 1 that is drawn from the bobbin 16 of the feeding device 51. In the second embodiment, the coating resin is an ultraviolet curable resin. The vicinity of the die 55 is where the amount of misalignment of the central axis C of the optical fiber 1 is small, and an out-of-focus degree can be most suppressed when lateral observation is made by the imaging device 54. The observation position P of the imaging device 54 is thus provided in the upstream vicinity of the die 55.

The ultraviolet irradiation unit 56 has the same configuration as that of the ultraviolet irradiation unit 14 illustrated in FIG. 1. The ultraviolet irradiation unit 56 irradiates the ultraviolet curable resin applied to the plurality of optical fibers 1 by the die 55 with ultraviolet light. The ultraviolet curable resin is cured by the irradiation of the ultraviolet light, and forms a coating covering the plurality of optical fibers 1 together. The optical fiber ribbon 6 including the plurality of optical fibers 1 and the coating is thus formed. The guide roller 57 guides the optical fiber ribbon 6 to the next step.

The calculator 58 has the same configuration as that of the calculator 17 illustrated in FIG. 1. The calculator 58 is communicably connected to the imaging device 54 and the first guide roller 31. The calculator 58 receives a plurality of the lateral observation images from the imaging device 54. The calculator 58 calculates a variable related to the azimuth angle φ about the central axis C of each of the plurality of optical fibers 1 based on the acquired plurality of the lateral observation images. The calculator 58 feedback controls the first guide roller 31 based on the calculation result. The calculator 58 transmits a control signal according to the calculation result to the first guide roller 31.

In the optical fiber ribbon 6 obtained in this manner, the amount of variation in the azimuth angle φ about the central axis C of each optical fiber 1 is 180° or less, preferably 120° or less, more preferably 90° or less, and further preferably 60° or less along the entire length. Here, the entire length is at least 100 m or more, preferably 1 km or more, more preferably 5 km or more, and particularly preferably 10 km or more. In a case in which the plurality of optical fibers 1 are MCFs, the plurality of optical fibers 1 are arranged in parallel such that central values of azimuth of arrangement of cores 3 of the plurality of optical fibers 1 match each other in the optical fiber ribbon 6. In a case in which the plurality of optical fibers 1 are polarization-maintaining optical fibers, the plurality of optical fibers 1 are arranged in parallel such that central values of azimuth of the principal axis of refractive index of the plurality of optical fibers 1 match each other in the optical fiber ribbon 6.

A production method of the optical fiber ribbon 6 according to the second embodiment includes a drawing step, an application step, and an ultraviolet light irradiation step. The drawing step is a step of drawing the plurality of optical fibers 1 that are fed from the feeding device 51. The application step is a step of applying a coating resin to surfaces of the plurality of optical fibers 1 together by the die 55. The ultraviolet light irradiation step is a step of irradiating the coating resin with ultraviolet light by the ultraviolet irradiation unit 56.

In the production method of the optical fiber ribbon 6 according to the second embodiment, feedback control is performed similarly to the production method of the optical fiber 1 according to the first embodiment. That is, in addition to the steps above, the production method of the optical fiber ribbon 6 further includes an acquisition step S1, a calculation step S2, and a rotation step S3 to feedback control (feedback operate) the azimuth angle φ about the central axis C of the optical fiber 1. The acquisition step S1 is a step of acquiring a lateral observation image of the plurality of optical fibers 1 by the imaging device 54. The calculation step S2 is a step of calculating a variable related to the azimuth angle φ about the central axis C of each of the plurality of optical fibers 1 by the calculator 58 based on the lateral observation image. The rotation step S3 is a step of applying a rotation to each of the plurality of optical fibers 1 by the first guide roller 31.

As described above, in the production method of the optical fiber ribbon 6, the plurality of optical fibers 1 are drawn from the feeding device 51, a variable related to the azimuth angle φ about the central axis C of the optical fiber 1 is obtained while forming a tape, and a rotation is applied to the optical fiber 1 based on the variable. The variation in the azimuth angle φ about the central axis C can thus be suppressed. As a result, the optical fiber ribbon 6 including the plurality of optical fibers 1 having the same azimuth angle φ about the central axis C can be produced.

In the acquisition step S1 of the production method of the optical fiber ribbon 6, the lateral observation image of the plurality of optical fibers 1 is acquired at the observation position P closer to the feeding device 51 than the die 55. The distance L1 between the observation position P and the die 55, and the distance L2 between the die 55 and the center of the line collection roller 53 satisfy $L1/L2 \leq 0.2$. The side surface of the optical fiber 1 is observed in a positional range in which the amount of axial misalignment of the optical fiber 1 is at a minimum, so that reduction in the observation accuracy can be suppressed.

The feeding device 51 includes a plurality of bobbins 18 onto which the plurality of optical fibers 1 are wound such that the amount of variation in the azimuth angle φ about the central axis C of each of the plurality of optical fibers 1 is 180° or less, preferably 120° or less, more preferably 90° or less, and further preferably 60° or less along the entire length. Thus, since the feeding device 51 feeds the optical fiber 1 in which the variation in the azimuth angle φ about the central axis C is suppressed, rotation alignment during the formation of a tape can be simplified. That is, the optical fiber ribbon 6 including the plurality of optical fibers 1 having the same azimuth angle φ about the central axis C can be easily produced by making minor adjustments.

In the optical fiber ribbon 6, the amount of variation in the azimuth angle φ about the central axis C of each of the plurality of optical fibers 1 is 180° or less, preferably 120° or less, more preferably 90° or less, and further preferably 60° or less along the entire length. Thus, in the optical fiber ribbon 6, the variation in the azimuth angle φ about the central axis C of each of the plurality of optical fibers 1 is suppressed.

In the case in which the plurality of optical fibers 1 are MCFs, and the plurality of optical fibers 1 are arranged in parallel such that the central values of azimuth of arrangement of the cores 3 of the plurality of optical fibers 1 match each other, rotational misalignment of the plurality of the cores 3 is suppressed in the optical fiber ribbon 6. In the case in which the plurality of optical fibers 1 are polarization-maintaining optical fibers, and the plurality of the optical fibers 1 are arranged in parallel such that the central values of azimuth of the principal axis of refractive index of the plurality of optical fibers 1 match each other, rotational misalignment of the principal axis of refractive index is suppressed in the optical fiber ribbon 6.

In the production device 50, the plurality of optical fibers 1 are drawn from the feeding device 51, a variable related to the azimuth angle q about the central axis C of the optical fiber 1 is obtained while forming a tape, and a rotation is applied to the optical fiber 1 based on the variable. The variation in the azimuth angle φ about the central axis C of each of the plurality of optical fibers 1 can thus be suppressed. As a result, the optical fiber ribbon 6 including the plurality of optical fibers 1 having the same azimuth angle φ about the central axis C can be produced.

The imaging device 54 includes the light source 21 that irradiates the side surfaces of the plurality of optical fibers 1 with light, and the detector 22 that detects the transmitted light transmitted through the plurality of optical fibers 1. The lateral observation image of the optical fiber 1 can thus be acquired.

Variation

Figure 9:
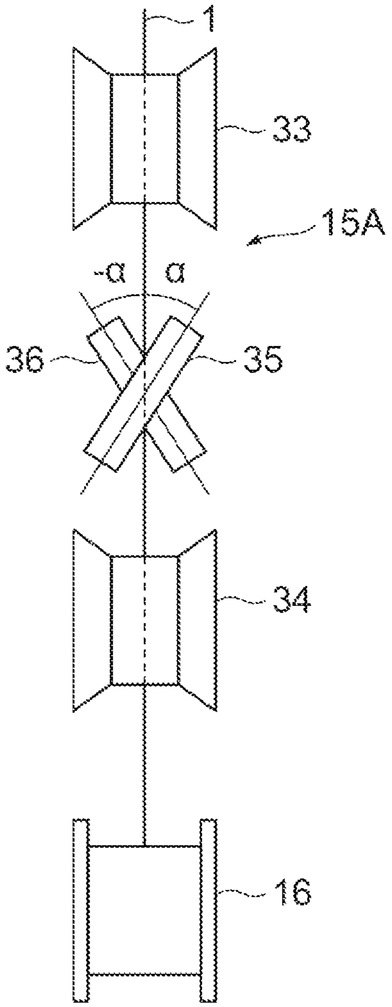
FIG. 9 is a schematic view illustrating a configuration of a guide roller unit according to a variation.
Figure 10:
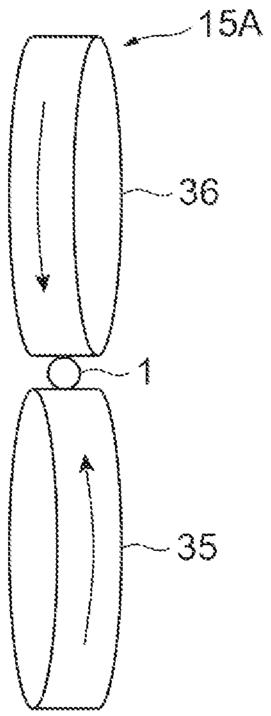
FIG. 10 is a top-down view of a third guide roller and a fourth guide roller.

FIG. 9 is a schematic view illustrating a configuration of a guide roller unit 15A according to a variation. FIG. 10 is a top-down view of a third guide roller 35 and a fourth guide roller 36. The guide roller unit 15A according to the variation has a first guide roller 33, a second guide roller 34, the third guide roller 35, and the fourth guide roller 36. The first guide roller 33 is provided on the upstream side (ultraviolet irradiation unit 14 side). The second guide roller 34 is provided on the downstream side (bobbin 16 side). The third guide roller 35 and the fourth guide roller 36 are provided between the first guide roller 33 and the second guide roller 34, and face each other with the optical fiber 1 interposed therebetween.

The third guide roller 35 is a swing guide roller, and swings in a range in which an angle ("first angle") between a plane perpendicular to a rotational axis of the third guide roller 35 and the central axis C of the optical fiber 1 (that is, a direction in which the optical fiber 1 advances) is $\pm\alpha$. The fourth guide roller 36 is a swing guide roller, and swings in a range in which an angle ("second angle") between a plane perpendicular to a rotational axis of the fourth guide roller 36 and the central axis C of the optical fiber 1 is $\pm\alpha$. The third guide roller 35 and the fourth guide roller 36 swing in opposite phase with each other. That is, while the third guide roller 35 changes the first angle from $-\alpha$ to $\alpha$, the fourth guide roller 36 changes the second angle from $\alpha$ to $-\alpha$. This enables clockwise and anticlockwise torque to be alternately applied to the optical fiber 1. In the guide roller unit 15A, the third guide roller 35 and the fourth guide roller 36 function as the rotation control unit that controls the azimuth angle $\varphi$ about the central axis C of the optical fiber 1.

The present disclosure is not limited to the embodiments and variation above. The embodiments and variation above may be combined as appropriate.

REFERENCE SIGNS LIST

1 . . . Optical fiber
2 . . . Glass fiber
3 . . . Core
4 . . . Cladding
5 . . . Optical fiber preform
6 . . . Optical fiber ribbon
10 . . . Production device
11 . . . Heating furnace
12 . . . Imaging device
13 . . . Die
14 . . . Ultraviolet irradiation unit
15, 15A . . . Guide roller unit
16 . . . Bobbin
17 . . . Calculator
21 . . . Light source
22 . . . Detector
31 . . . First guide roller
32 . . . Second guide roller
33 . . . First guide roller
34 . . . Second guide roller
35 . . . Third guide roller
36 . . . Fourth guide roller
50 . . . Production device
51 . . . Feeding device
52 . . . Guide roller unit
53 . . . Line collection roller
54 . . . Imaging device
55 . . . Die
56 . . . Ultraviolet irradiation unit
57 . . . Guide roller
58 . . . Calculator
C . . . Central axis
P . . . Observation position
$\varphi$ . . . Azimuth angle

What is claimed is:

1. An optical fiber production method for producing an optical fiber including a glass fiber, the method comprising:
heating and melting an optical fiber preform by a heating furnace, and drawing the glass fiber;
acquiring a lateral observation image of the glass fiber at an observation position;
calculating a variable related to an azimuth angle about a central axis of the glass fiber based on the lateral observation image;
applying a rotation about the central axis to the glass fiber based on the variable; and
applying a coating resin to a surface of the glass fiber by a die,
wherein the variable is one of a correlation coefficient, a luminance value of a maximum or minimum of a luminance profile of the lateral observation image, or the azimuth angle calculated from a luminance profile of the lateral observation image,
wherein the observation position is between the die and the optical fiber preform, and a distance L1 between the observation position and the die and a distance L2 between the die-and a center of the heating furnace satisfy $L1/L2 \leq 0.2$.

2. The optical fiber production method according to claim 1,
wherein the variable is a correlation coefficient between a luminance profile of the lateral observation image acquired at a first time, and a luminance profile of the lateral observation image acquired at a second time after a predetermined time has passed from the first time.

3. The optical fiber production method according to claim 1,
wherein the variable is a first luminance value of a maximum or minimum of a first luminance profile of the lateral observation image acquired at a first time, and a second luminance value of a maximum or minimum of a second luminance profile of the lateral observation image acquired at a second time after a predetermined time has passed from the first time,
wherein the first luminance profile and the second luminance profile are quantitative representations of light intensity across the lateral surface of the optical fiber.

4. The optical fiber production method according to claim 1,
wherein the variable is the azimuth angle calculated from a luminance profile of the lateral observation image using a regression analysis result based on a multivariate analysis performed on a luminance profile of a desired rotation angle of the optical fiber acquired in advance.

5. The optical fiber production method according to claim 1,
wherein applying the rotation includes applying a rotation to the glass fiber by a swing guide roller.

6. The optical fiber production method according to claim 1, further comprising winding the optical fiber onto a bobbin such that an amount of variation in the azimuth angle is 180° or less along an entire length.

* * * * *